United States Patent
Alles et al.

(10) Patent No.: US 9,693,333 B2
(45) Date of Patent: Jun. 27, 2017

(54) SYSTEM AND METHOD FOR LOCATION BOOSTING USING PROXIMITY INFORMATION

(75) Inventors: Martin Alles, Vienna, VA (US); Thomas B. Gravely, Herndon, VA (US); Khalid W. Al-Mufti, Sterling, VA (US); Andrew E. Beck, Ashburn, VA (US)

(73) Assignee: CommScope Technologies LLC, Hickory, NC (US)

( * ) Notice: Subject to any disclaimer, the term of this patent is extended or adjusted under 35 U.S.C. 154(b) by 360 days.

(21) Appl. No.: 13/984,463

(22) PCT Filed: Feb. 9, 2012

(86) PCT No.: PCT/US2012/024483
§ 371 (c)(1),
(2), (4) Date: Nov. 24, 2014

(87) PCT Pub. No.: WO2012/109446
PCT Pub. Date: Aug. 16, 2012

(65) Prior Publication Data
US 2015/0148055 A1    May 28, 2015

Related U.S. Application Data

(60) Provisional application No. 61/441,118, filed on Feb. 9, 2011.

(51) Int. Cl.
  H04W 24/00     (2009.01)
  H04W 64/00     (2009.01)
  (Continued)

(52) U.S. Cl.
  CPC .......... *H04W 64/00* (2013.01); *G01S 5/0036* (2013.01); *G01S 5/0072* (2013.01); *H04W 4/023* (2013.01);
  (Continued)

(58) Field of Classification Search
  CPC ... H04W 64/00; H04W 4/003; H04W 64/003; H04W 24/10; H04W 88/02; G01S 5/0036; G01S 5/0072
  (Continued)

(56) References Cited

U.S. PATENT DOCUMENTS

| 5,987,329 A * | 11/1999 | Yost ...................... H04W 64/00 |
| | | 342/357.31 |
| 6,243,252 B1 * | 6/2001 | Kuroiwa .............. H01G 4/2325 |
| | | 361/303 |

(Continued)

FOREIGN PATENT DOCUMENTS

| WO | 2005/034557 A1 | 4/2005 |
| WO | 01/58098 A2 | 8/2011 |

OTHER PUBLICATIONS

Michael Spratt; "An Overview of Positioning by Diffusion"—The Journal of Mobile Communication, Computation and Information; Kluwer Academic Publishers, DO, Manufactured in the Netherlands; vol. 9, No. 6; Nov. 1, 2003; pp. 565-574.

(Continued)

*Primary Examiner* — Marceau Milord
(74) *Attorney, Agent, or Firm* — Fogg & Powers LLC (57) ABSTRACT

A system and method for determining the location of a target mobile device in a communications network. A set of mobile devices in proximity to the target mobile device may be determined as a function of a common parameter of information observed by mobile devices in the set. Measurement data may be shared for the set of mobile devices and the target mobile device, and a location of the target mobile device determined as a function of the shared measurement data. This sharing of measurement data may occur amongst the set of mobile devices and the target mobile device or may also occur at a communications network entity.

26 Claims, 5 Drawing Sheets

(51) Int. Cl.
*G01S 5/00* (2006.01)
*H04W 4/02* (2009.01)
*H04W 24/10* (2009.01)
*H04W 88/02* (2009.01)

(52) U.S. Cl.
CPC .......... *H04W 64/003* (2013.01); *H04W 24/10* (2013.01); *H04W 88/02* (2013.01)

(58) Field of Classification Search
USPC ...... 455/456.1, 456.2, 456.4, 450, 433, 439, 455/62
See application file for complete search history.

(56) References Cited

U.S. PATENT DOCUMENTS

| | | | | |
|---|---|---|---|---|
| 7,015,817 B2* | 3/2006 | Copley | .............. | G08B 21/0283 340/539.13 |
| 8,112,100 B2* | 2/2012 | Frank | ................ | G06Q 10/1095 455/414.2 |
| 8,385,964 B2* | 2/2013 | Haney | .................. | H04W 12/08 455/404.1 |
| 8,712,427 B2* | 4/2014 | Bienas | .............. | H04M 15/8033 455/414.2 |
| 8,725,569 B2* | 5/2014 | Liang | ..................... | H04W 4/02 705/14.49 |
| 8,798,613 B2* | 8/2014 | MacNaughtan | ... | G06Q 30/0241 455/422.1 |
| 8,810,392 B1* | 8/2014 | Teller | ..................... | G08B 21/24 235/385 |
| 8,897,741 B2* | 11/2014 | Johnson | .................. | H04W 4/02 370/331 |
| 9,037,485 B2* | 5/2015 | Fu | .......................... | H04L 51/04 705/14.66 |
| 9,134,398 B2* | 9/2015 | Dupray | ................... | G01S 1/026 |
| 2005/0192026 A1* | 9/2005 | Carlson | ..................... | G01S 5/06 455/456.1 |
| 2009/0011779 A1* | 1/2009 | MacNaughtan | ...... | G01S 5/0252 455/456.6 |
| 2010/0069035 A1* | 3/2010 | Johnson | .................. | H04W 4/02 455/404.1 |
| 2010/0291907 A1* | 11/2010 | MacNaughtan | ... | G06Q 30/0241 455/414.1 |
| 2013/0317944 A1* | 11/2013 | Huang | .................. | G01S 5/0252 705/26.61 |
| 2013/0337789 A1* | 12/2013 | Johnson | .................. | H04W 4/02 455/414.1 |
| 2014/0310366 A1* | 10/2014 | Fu | .......................... | H04L 51/04 709/206 |

OTHER PUBLICATIONS

Hui Liu, et al.; "Survey of Wireless Indoor Positioning Techniques and Systems"; IEEE Transactions on Systems, Man, and Cybernetics: Part C: Applications and Reviews, IEEE Service Center, Piscataway, NJ, US, vol. 37. No. 6; pp. 1067-1080; Nov. 1, 2007.

* cited by examiner

SYSTEM AND METHOD FOR LOCATION BOOSTING USING PROXIMITY INFORMATION

CROSS REFERENCES

The instant application is a U.S. national phase application of PCT International Application No. PCT/US2012/024483 having an international filing date of 9 Feb. 2012 and entitled "System and Method for Location Boosting Using Proximity Information", which claims priority benefit of U.S. Provisional application entitled "Location Boosting Using Proximity Information," Application Ser. No. 61/441,118, filed on Feb. 9, 2011, the entirety of which is incorporated herein by reference.

BACKGROUND

Applicant's disclosure is generally directed towards the location of a mobile device within a communications network. There are many traditional methods of locating a mobile device including, but not limited to, handset-based techniques and network-based techniques. These techniques may include, but are not limited to, Assisted-Global Positioning Satellite (A-GPS), Uplink Time Difference of Arrival (U-TDOA), Observed TDOA (O-TDOA), Enhanced Observed Time Difference (E-OTD), Electronic Cell Identification (E-CID), Radio Frequency (RF) fingerprinting, and Multiple Range Estimation Location (MREL) techniques, to name a few. Such techniques, however, may be ineffective in locating mobile devices in certain challenging environments, e.g., urban environments, indoor environments, etc.

Several telecommunications industry reports have indicated a higher usage of mobile devices in such challenging environments as well as higher usage of location based applications in recent years. Mobile devices operating in these environments may be blocked from receiving GPS signals due to the signal attenuation of the satellite signals by building infrastructure and/or other environmental aspects. This same infrastructure may also attenuate the signals transmitted by cellular towers such that cellular service may be unavailable. Such challenging environments often provide a paucity of positional or location measurements that would enable determining the location of mobile devices. This insufficiency of measurements may lead to a poor location estimate for the mobile device and/or an inability of the respective system or device to generate the location estimate. One example of such insufficient measurements may occur during the location of a mobile device inside a building, under heavy cloud cover, or when obstructed by large structures. These situations may arise in the context of A-GPS location and/or terrestrial location determinations, with or without Location Measurement Units (LMU), or in any combination thereof. Additionally, even in RF pattern matching schemes, an indoor mobile device may provide poor RF signatures as exemplary schemes may rely upon calibration data obtained in the outdoor environment.

Therefore, there is a need in the art for a system and method to improve location capabilities of a communications system in such environments. There is a further need in the art to increase or boost the number of available positional measurements for the location determination of a mobile device.

In view of these needs, one embodiment of the present subject matter provides a method of determining the location of a target mobile device in a communications network. The method may include determining a set of mobile devices in proximity to the target mobile device as a function of a common parameter of information observed by mobile devices in the set and sharing measurement data amongst the set of mobile devices and the target mobile device. A location of the target mobile device may then be determined as a function of the shared measurement data.

Another embodiment of the present subject matter provides a method of determining the location of a target mobile device in a communications network. The method may include determining a set of mobile devices in proximity to the target mobile device as a function of a common parameter of information observed by mobile devices in the set. Measurement data from mobile devices in the set and from the target mobile device may be transmitted to a communications network entity. A location of the target mobile device may then be determined as a function of both the transmitted measurement data from the set of mobile devices and the transmitted measurement data from the target mobile device.

A further embodiment of the present subject matter may provide a method of determining the location of a target mobile device in a communications network. The method may include determining a set of mobile devices in proximity to the target mobile device as a function of a common parameter of information observed by mobile devices in the set and determining locations of one or more mobile devices in the set. The determined locations may be shared amongst mobile devices in the set and the target mobile device. A location of the target mobile device may then be determined as a function of the shared determined locations.

An additional embodiment of the present subject matter may provide a method of determining the location of a target mobile device in a communications network. The method may include determining one or more common parameters of information for mobile devices in proximity to the target mobile device and identifying a set of mobile devices as a function of the determined one or more common parameters. A location of the target mobile device may be determined as a function of the measurement data from the set of mobile devices.

Another exemplary embodiment for determining the location of a target mobile device in a communications network may include determining a set of mobile devices in proximity to the target mobile device as a function of a common parameter of information observed by mobile devices in the set and then determining a location of the target mobile device as a function of measurement data from the determined set of mobile devices.

These and other embodiments of the present subject matter will be readily apparent to one skilled in the art to which the disclosure pertains from a perusal or the claims, the appended drawings, and the following detailed description.

DETAILED DESCRIPTION

With reference to the figures, where like elements have been given like numerical designations to facilitate an understanding of the present subject matter, the various embodiments of a system and method for location boosting using proximity information are described.

Embodiments of the present subject may generally determine the location of a mobile device by proximity detection by recognizing the need for a mobile device to be located. This may be accomplished by, for example, a tasking message provided by cellular network equipment monitoring calls (e.g., 911 detection), by scanning receivers located in the proximity of a region of location coverage, by a user of the mobile device itself requesting a location. One or more proximity sensors in the network may also be tasked to receive signals from the mobile transmission of interest and/or measure transmission signal quality. Measurements may then be compiled from the tasked proximity sensors or other network components and the location of the mobile device determined. Exemplary methods for proximity detection are described in co-pending U.S. patent application Ser. No. 12/986,439, entitled "System and Method for Mobile Location by Proximity Detection," filed on Jan. 7, 2011, the entirety of which is incorporated herein by reference.

Figure 1:
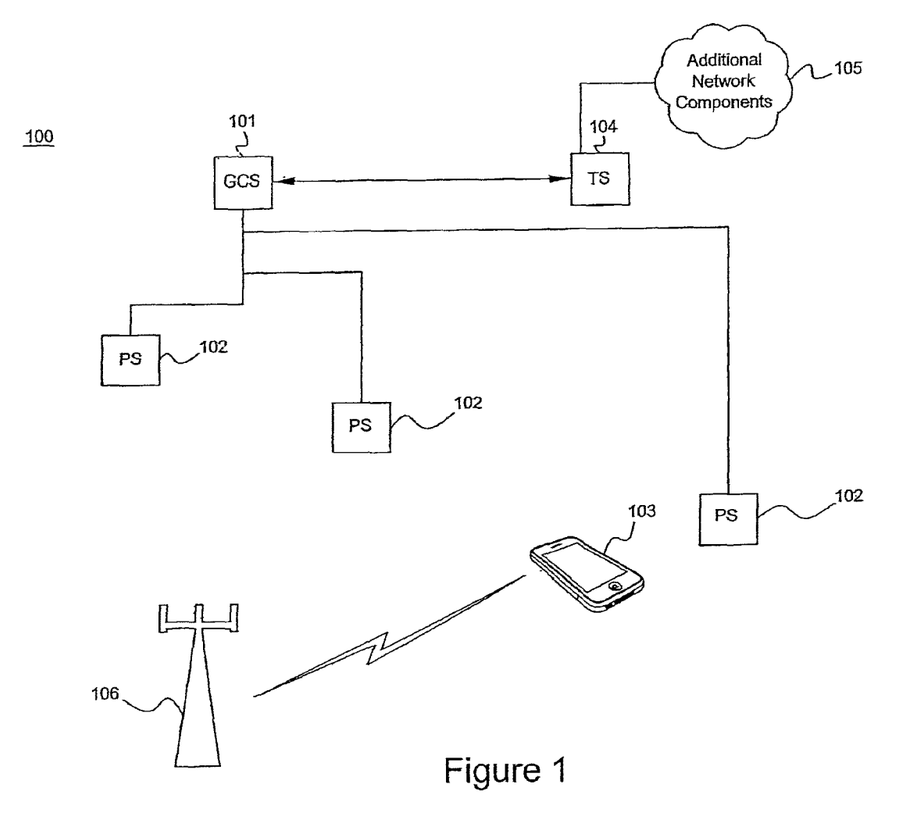
FIG. 1 is a diagram of a basic architecture for an embodiment of the present subject matter.

FIG. 1 is a diagram of a basic architecture for an embodiment of the present subject matter. With reference to FIG. 1, a mobile device 103 of interest may be in communication with a base station 106 in an exemplary communications network 100. A Geolocation Control System (GCS) 101 in the network 100 may receive tasking from a Tasking Server (TS) 104. The TS 104 may be operably connected to other components 105 of the communications network 100. In one embodiment, the network 100 may also include one or more Proximity Sensors (PS) 102 and/or Location Measurement Units (LMU). These PSs 102 may receive a location request from the GCS 101 and may attempt to detect the mobile device 103 of interest. Any one or each PS 102 may also report the quality of its detection measurements to the GCS 101. The GCS 101 may then utilize these reports to determine a location of the mobile device 103.

In other embodiments of the present subject matter, the TS 104 may be embedded in certain network core components (e.g., Serving Mobile Location Center (SMLC), etc.). The TS 104 may also be embedded within one or more PSs 102 (to receive off-the-air tasking). Alternatively, the TS 104 may be supplied by an independent receiver apparatus, the PS 102 may be embedded in a complementary repeater or Distributed Antenna System (DAS), and LMUs (not shown) may be situated at the base station 106.

Embodiments of the present subject matter may increase or boost the number of available positional measurements by considering a set, subset or even the entirety of measurements available to mobile devices in proximity to the mobile device whose location is desired (i.e., target mobile device). It should be noted that the terms position, positional and/or location are used interchangeably in this disclosure and such use should not limit the scope of the claims appended herewith. Generally, positional measurements such as, but not limited to, Time Difference of Arrival (TDOA) measurements, GPS pseudoranges, MREL measurements, and the like, may possess errors due to environmental conditions, etc. Thus, in embodiments of the present subject matter where positional measurements pertinent to mobile devices in proximity to the target mobile device are combined with the positional measurements for the target mobile device, a larger measurement set may be available to determine a location of the target mobile device. This larger measurement set representative of the measurements of a group of mobile devices may be an accidental, unplanned organization of multiple mobile devices into the group such that members of the group or set are proximate to each other. It should be noted that the terms set and group are used interchangeably in this disclosure and such use should not limit the scope of the claims appended herewith. Further, this group may also be visualized as a single, physically distributed sensor with a membership that is not necessarily permanent.

Such an exemplary group may be formed by determining any one or more common features of observed positional measurements at the sensors of the mobile devices. For example, observation measurements may be made by mobile devices on a Bluetooth radio channel, another radio or television signal, and/or a Wi-Fi signal, etc. Depending upon the particular observed measurement, the interpretation given to the word proximity may change. Thus, if the group or a subset of the group all see the same, for example, Wi-Fi access point or Verizon Personal HotSpot, then this may provide an estimate or interpretation for the proximity of the group's members. That is, this common observable may define a distance regarding the maximum distance apart members of the group are to each other. Exemplary common observables or parameters may be, but are not limited to, a Wi-Fi access point, Bluetooth radio channel information, Wi-Fi signal information, radio frequency (RF) signal parameter of signal transmissions from the mobile device, channel number information, channel frequency information, timeslot information, network timing information, range information, spreading code information, received signal strength indications, signal to noise ratios (SNR), ratios of energy per bit over power spectral density of noise and interference (Eb/Io), ratios of received pilot energy over power spectral density of noise and interference (Ec/Io), dialed number information, an identification of the mobile device, an international mobile subscriber identity (IMSI), a temporary mobile subscriber identity (TMSI), a mobile identification number (MIN), an electronic serial number (ESN), an international mobile equipment identity (IMEI), a class mark indicator, overhead transmission indicator, media access control (MAC) address, IP address, available time assistance information, satellite-in-view information, network timing information, range measurement information to a terrestrial site, and combinations thereof. By way of further example, if the observed measurements were made by the group on or via a Bluetooth Piconet, then the group's proximity may be on the order of 100 m. Of course, additional exemplary parameters may include attribute(s) of measurements or sets of measurements made by mobile devices. For example, if a first mobile device has range measurements with respect to sites [A, B and C] and a second mobile device TDOA measurements with respect to sites [A, B] and [A, C], then an exemplary parameter may be the fact that both the first and second mobile devices have measurements against the common set of sites [A, B, C]. Thus, the general principle to be emphasized is that the group or subset thereof may share some features in which each feature or group of features has some defining proximity or common parameter.

Exemplary groups according to an embodiment of the present subject matter may be identified in various methods. For example, mobile devices may mutually share information with each other. As a function of this sharing of information, the devices may cooperatively define the group. In another embodiment, an external observer or entity, e.g., the wireless communications network or component thereof, may determine that some number of mobile devices in the network defines or constitutes a group. In this embodiment, the members of the group may be unaware that they are indeed a member of the group and may not even directly communicate with each other; thus, the network may define the group and combine and/or share positional measurements from mobile devices in the group and/or measurements from the target mobile device.

Once the group has been identified and/or defined, positional measurements may be shared between or amongst members of the group. As mentioned above, this sharing of positional measurements may occur peer-to-peer between members of the group or any number of members of the group may report measurements to the network whereby the network combines and/or shares the measurements. Thus, by considering these measurements collectively, the group of mobile devices and individual members thereof may now be located with a higher precision than any of its members prior to such consideration. That is, the location accuracy of every member of the group may now be improved with knowledge of the positional measurements for other members of the group. For example, by combining positional measurements of a target mobile device with positional measurements of one or more other mobile devices in proximity to the target mobile device, errors associated with positional measurements from any of the devices in the group may be limited by the degree of proximity among the group's members and by the errors in the respective measurements. Thus, even when faced with not being able to perform a location determination for the target mobile device alone, having even one measurement from a distant member in a proximate group may allow the target mobile device to determine at least an estimated location where previously there was none.

In additional embodiments of the present subject matter, once the shared measurement process has occurred, a location calculation for the group may be performed by one of the members of the group, may be performed in some distributed fashion over the members of the group, or may be performed at a network entity. In these embodiments, the group itself may have an associated location.

In one non-limiting example, a user of a mobile device has an application available on his or her device that activates when 9-1-1 is dialed or when the network sends a high priority message to the mobile device. When this application is activated, the mobile device may, for example, establish a connection to a Bluetooth network and may establish connections to other Bluetooth enabled devices in its vicinity. This group may be formed utilizing the Bluetooth protocol, and mobile devices may also be linked together to form groups using a Bluetooth Scatternet (an extension of a Bluetooth Piconet). One embodiment may identify a group of mobile devices in terms of their respective TMSI or other mobile device common parameter as noted above. Upon determining such a common feature or parameter, Bluetooth MAC addresses or another parameter may also be employed to serve as linked identifiers to the TMSI, that is, the network may maintain a database associating the Bluetooth MAC address with the TMSI to provide the network with necessary information to call for any additional positional measurements. The application on the mobile device may then, in one embodiment, share the MAC addresses between the participating mobile devices in the group. A first group of mobile devices proximate to the target mobile device may then be determined from the Bluetooth MAC addresses. The target mobile device or one of the mobile devices in the first group may provide the identifying or defining group information back to the network whereby the network initiates a location request to the members of the first group. This request may result in multiple positional measurement sets for all mobile devices proximate to the target mobile device. Such measurement data may now be available to boost or increase the location information for the target mobile device and other devices in the group. Of course, any other variations of this exemplary process are possible. For example, in an emergency and if there are insufficient measurements with the first group of mobile devices, the network can activate similar applications on all or any of the mobile devices in the group sharing the same serving sector, timing advance band, etc. Thus, in certain embodiments, participation of mobile devices in a group may be compelled on an emergency basis.

Furthermore, mobile devices in a group may be chained or linked. For example, a first group of mobile devices may lead to a second group or subgroup of the first group and so forth to an $n^{th}$ group whereby the $n^{th}$ group may generally represent the expected reach of the respective air interface protocol signals from the target mobile device. Thus, if the positional measurements of the $n^{th}$ group were needed to be combined or shared with those of the target mobile device, one may be provided with an estimation of how accurately a location of the target mobile device can be achieved. This chained or linked process may be applied to a scenario where the target mobile device is located on a high floor of a building and the chained location process works its way down to the street level where there is a mobile device with positional measurements that may be fruitfully combined with the positional measurements (or lack thereof) from the target mobile device to determine a location for the target mobile device. Thus, if this street level mobile device can be independently located, then the number of hops, N, may provide an estimation of what floor the target mobile device is on or at least may set an upper bound for the location of the target mobile device. In this instance, an exemplary property of certain protocols, such as but not limited to Bluetooth, would be the limited range of the protocol which may enhance the accuracy of the location of a respective group or target mobile device. In protocols having a larger range, combined location estimates may possess a larger variance in their errors, thus other features or parameters may be employed to define the group. Accordingly, exemplary features defining a group may be such that members of the group have a desired proximity to each other whereby the specific proximity varies according to the respective communications protocol.

In a network-based definition for the previous example, mobile devices may report observed Bluetooth MAC addresses in their proximity back to the network. The network may then determine what constitutes a group based upon which mobile devices are in view of other mobile devices. The network may then request members of the group to report their positional measurements and may determine a location for the group and/or may refine this location individually for each member or certain subgroups. Exemplary positional measurements and measurement data may include, but are not limited to, Angle-of-Arrival (AOA) data, Observed Time-Difference-of-Arrival (OTDOA) data, Enhanced-OTD (E-OTD) data, Enhanced Cell-ID (E-CID) data, global navigation satellite system (GNSS) data, assisted global navigation satellite system (A-GNSS) data, uplink time of arrival (TOA) data, downlink TOA data, uplink TDOA (U-TDOA) data, Wi-Fi data, Multiple Range Estimation Location (MREL) data, Radio Frequency (RF) fingerprinting data, and combinations thereof. For example, in the case of RF Fingerprinting data, if a first mobile device observes signals from sites A and B having respective power levels $P_A$, $P_B$, and a second mobile device in the same proximity group observes signals from sites C and D having respective power levels $P_C$, $P_D$, then an exemplary RF fingerprinting method applied to embodiments of the present subject matter may match power levels for the site set [A B C D] given by $[P_A\ P_B\ P_C\ P_D]$ against a calibration database. The resultant solution may then provide a location to the group containing the first and second mobile devices. Thus, embodiments of the present subject matter may incorporate the aggregation of RF fingerprinting type measurements, as it would any other type of measurement.

In another embodiment, one mobile device in a group may already possess a determined location which it may share directly with other devices in the group or to the network in which the members of the group may assign as their own location. Alternatively, a mobile device may have enough positional measurements to perform a location determination which it performs and then shares with the group or network. In one embodiment, the network, having knowledge what constitutes the membership of the group, may assign the location of any one or several of the members of the group as the location of a previously determined member. In such instances, embodiments of the present subject matter are sharing determined locations rather than just sharing positional measurements. For example, if one member of the group has no location information while all or some of the other members have location information, the network may assign an average of the known locations to the desired location of this member. Of course, such an example should not limit the scope of the claims appended herewith as any number of metrics of locations may be applied including, but not limited to, a location of one mobile device in the group, a centroid of locations of mobile devices in the group, a straight average of ones of the locations of mobile devices in the group, a weighted average of ones of the locations of mobile devices in the group, a weighted average and a straight average of ones of the mobile devices in the group, and combinations thereof. Thus, it is an aspect of embodiments of the present subject matter to resolve location problems that are currently intractable due to varying degrees of accuracy.

To provide a non-limiting example of measurement sharing, members of a group may share their GPS pseudo-range measurements, depending upon the type of time assistance available to the mobile devices in the group, when the location of the group is requested by the network, the sharing operation may differ. For example, if the network is capable of only providing coarse-time assistance information to the GPS-capable mobile devices, then the location server may combine the pseudo-ranges from different mobile devices. Thus, if a first mobile device in the group has Satellites A and B in view and a second mobile device in the group has Satellites C and D in view, then pseudo-ranges A through D may be combined to locate the group. In another embodiment, if fine-time assistance is available for individual mobile devices within the group, then even if a single pseudo-range from each device is available, i.e., each mobile device has a different satellite in view, the positional measurements may be combined to determine an approximate location of the group, assuming the group in this example includes four or more mobile devices. In another embodiment, if fine-time assistance is unavailable, a post correction technique may be applied at the location server. Such an exemplary technique may require mobile devices in the group to report a network timing to GPS measurement relationship (e.g., the GSM frame number relative to which it determined the GPS frame offset, or pseudo ranges) to the location server. Further, a location server that can obtain the network timing to GPS time relationship (e.g., via LMUs that located within the network) may alternatively remove GPS time uncertainty from the positional measurements thereby allowing the location server to combine the pseudo-range measurements in pairs, single measurements, or otherwise.

In another example, a group may include four mobile devices each of which has a range measurement to a terrestrial site. In this example, the first mobile device of the group is capable of locating itself irrespective of whether the device had access to the measurements of other members in the group. Further, the first mobile device in this example has a larger range measurement to the terrestrial site than any of the other mobile devices in the group. A location server may examine these measurements and conclude that the first mobile device had an erroneous or multipath measurement and may replace this erroneous measurement with an average of the other three measurements. In this example, the first mobile device, while capable of locating itself, is provided with a mechanism for significantly increasing its location accuracy by using the information collectively available in the group. Thus, the spatial diversity of each member of the group has increased as a result of being identified in this group.

Figure 2:
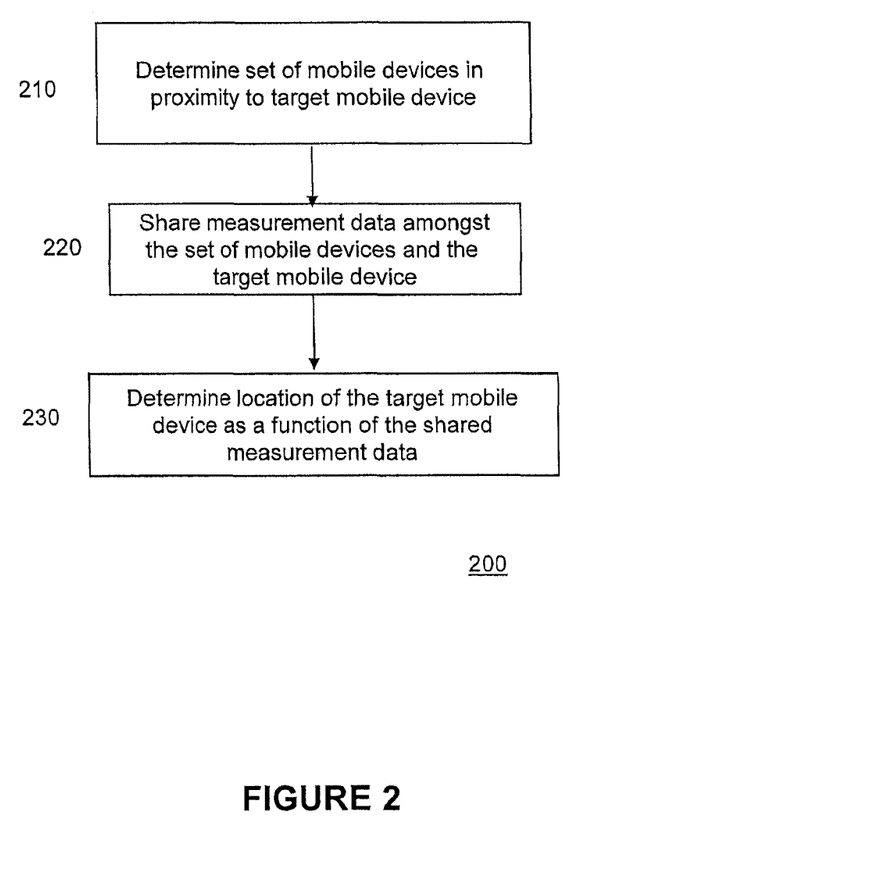
FIG. 2 is a block diagram of one embodiment of the present subject matter.

FIG. 2 is a block diagram of one embodiment of the present subject matter. With reference to FIG. 2, a method 200 of determining the location of a target mobile device in a communications network is provided. In step 210, a set of mobile devices in proximity to the target mobile device may be determined as a function of a common parameter of information observed by mobile devices in the set. In one embodiment, step 210 may include determining the set of mobile devices cooperatively by devices in the set as a function of the shared measurement data or the determination may be performed by a communications network entity. Further, in step 210 a subset of mobile devices may be identified as a function of a second parameter whereby the second parameter is not common to each mobile device in the set of mobile devices. Exemplary common parameters may be, but are not limited to, a Wi-Fi access point, Bluetooth radio channel information, Wi-Fi signal information, radio frequency (RF) signal parameter of signal transmissions from the mobile device, channel number information, channel frequency information, timeslot information, network timing information, range information, spreading code information, received signal strength indications, SNRs, Eb/Io, Ec/Io, dialed number information, an identification of the mobile device, IMSI, TMSI, MIN, ESN, IMEI, a class mark indicator, overhead transmission indicator, MAC address, IP address, available time assistance information, satellite-in-view information, network timing information, range measurement information to a terrestrial site, and combinations thereof. Exemplary measurement data may be, but is not limited to, AOA data, OTDOA data, E-OTD data, E-CID data, GNSS data, A-GNSS data, uplink TOA data, downlink TOA data, U-TDOA data, Wi-Fi data, MREL data, RF fingerprinting data, and combinations thereof.

In step 220, measurement data may be shared amongst the set of mobile devices and the target mobile device. At step 230, a location of the target mobile device may be determined as a function of the shared measurement data. In one embodiment, step 230 may include determining a location for the set of mobile devices and determining the location of the target mobile device as a function of the determined location for the set. In yet another embodiment, step 230 may include correcting measurement data from either the target mobile device or a mobile device in the set using the shared measurement data and determining the location of the target mobile device as a function of the corrected measurement data. Exemplary locations for the set of mobile devices may be, but are not limited to, a location of one mobile device in the set, a centroid of locations of mobile devices in the set, a straight average of locations of mobile devices in the set, a weighted average of locations of mobile devices in the set, and a weighted average and a straight average of mobile devices in the set. In a further embodiment, step 230 may include transmitting a location request to mobile devices in the set, providing measurement data from mobile devices in the set to a network entity in response to the location request, and determining a location of the target mobile device as a function of a set of the provided measurement data.

Another exemplary embodiment for determining the location of a target mobile device in a communications network may include determining a set of mobile devices in proximity to the target mobile device as a function of a common parameter of information observed by mobile devices in the set and then determining a location of the target mobile device as a function of measurement data from the determined set of mobile devices. In a further embodiment, the step of determining a location of the target mobile device further may include sharing measurement data amongst the set of mobile devices and the target mobile device and determining the location using the shared data.

Figure 3:
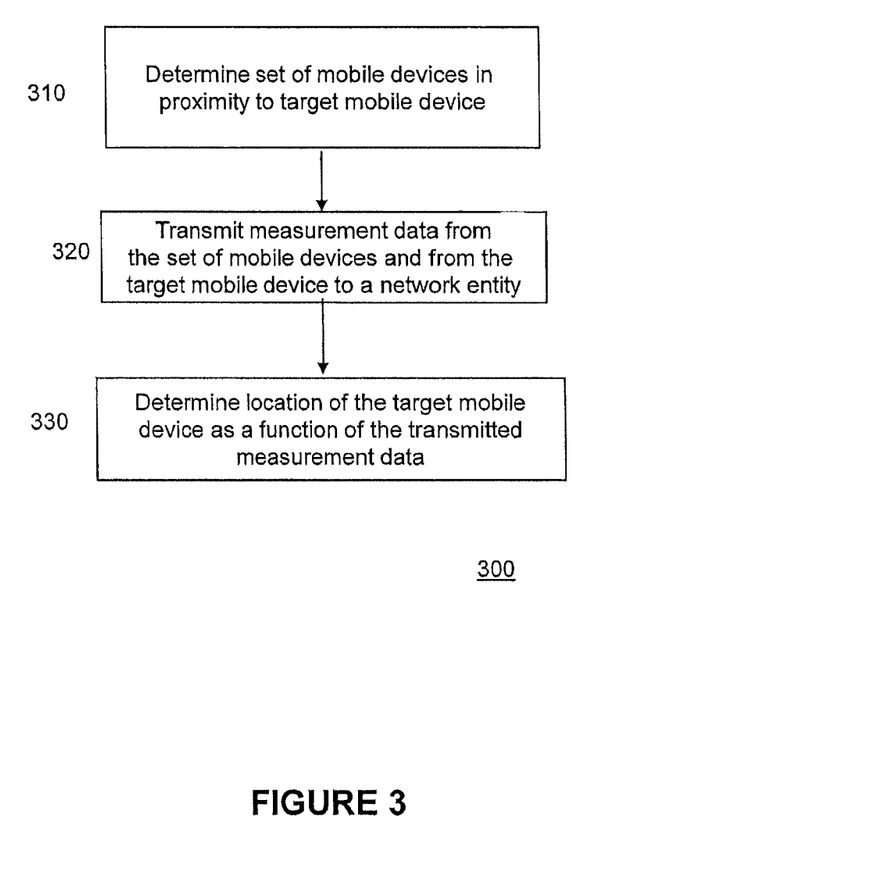
FIG. 3 is a block diagram of a further embodiment of the present subject matter.

FIG. 3 is a block diagram of a further embodiment of the present subject matter. With reference to FIG. 3, a method 300 of determining the location of a target mobile device in a communications network is provided. At step 310, a set of mobile devices in proximity to the target mobile device may be determined as a function of a common parameter of information observed by mobile devices in the set. In one embodiment, step 310 may be performed by the communications network entity. Measurement data from mobile devices in the set and from the target mobile device may be transmitted to a communications network entity at step 320. At step 330, a location of the target mobile device may then be determined as a function of both the transmitted measurement data from the set of mobile devices and the transmitted measurement data from the target mobile device. As noted above, exemplary common parameters may include a Wi-Fi access point, Bluetooth radio channel information, Wi-Fi signal information, RF signal parameters of signal transmissions from the mobile device, channel number information, channel frequency information, timeslot information, network timing information, range information, spreading code information, received signal strength indications, signal to noise ratios, Eb/Io, Ec/Io, dialed number information, an identification of the mobile device, IMSI, TMSI, MIN, ESN, IMEI, a class mark indicator, overhead transmission indicator, MAC address, IP address, available time assistance information, satellite-in-view information, network timing information, range measurement information to a terrestrial site, and combinations thereof. Further, exemplary measurement data may be, but is not limited to, AOA data, OTDOA data, E-OTD data, E-CID data, GNSS data, A-GNSS data, uplink TOA data, downlink TOA data, U-TDOA data, Wi-Fi data, MREL data, RF fingerprinting data, and combinations thereof.

Figure 4:
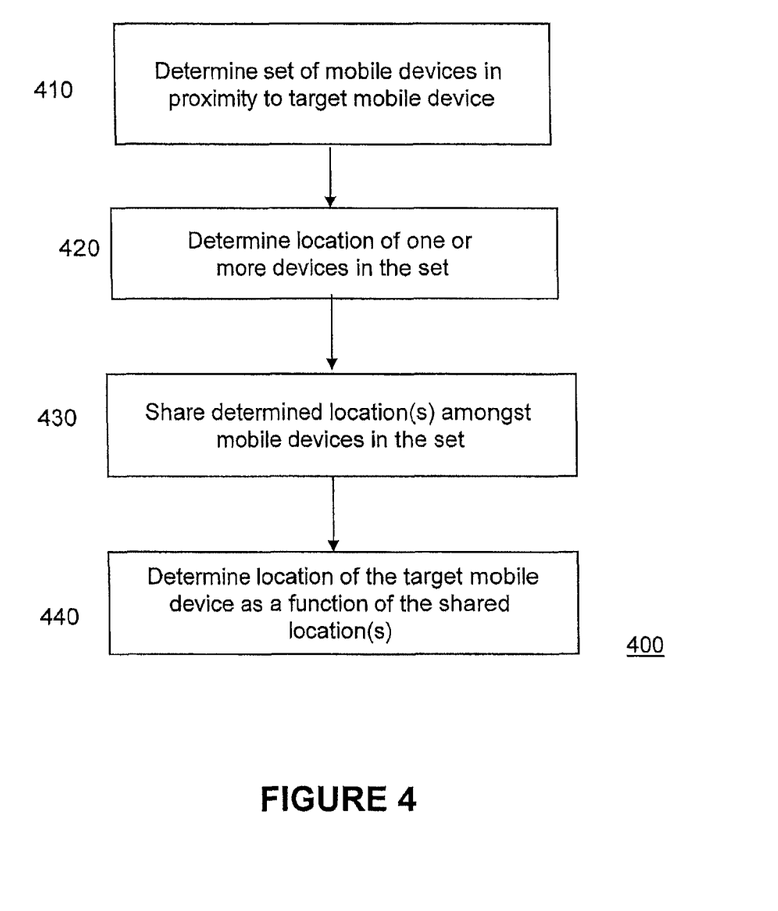
FIG. 4 is a block diagram of an additional embodiment of the present subject matter.

FIG. 4 is a block diagram of an additional embodiment of the present subject matter. With reference to FIG. 4, a method 400 for determining the location of a target mobile device in a communications network is provided. At step 410 a set of mobile devices in proximity to the target mobile device may be determined as a function of a common parameter of information observed by mobile devices in the set. Locations of one or more mobile devices in the set may be determined at step 420, and the determined locations shared amongst mobile devices in the set and the target mobile device at step 430. A location of the target mobile device may then be determined at step 440 as a function of the shared determined locations. The determined location of the target mobile device may be a location of one mobile device in the set, a centroid of locations of mobile devices in the set, a straight average of locations of mobile devices in the set, a weighted average of locations of mobile devices in the set, and a weighted average and a straight average of mobile devices in the set. In one embodiment, step 440 may include determining a location for the set of mobile devices, and determining the location of the target mobile device as a function of the determined location for the set. Of course, in this alternative embodiment, the determined location of the target mobile device may also be a location of one mobile device in the set, a centroid of locations of mobile devices in the set, a straight average of locations of mobile devices in the set, a weighted average of locations of mobile devices in the set, and a weighted average and a straight average of mobile devices in the set.

Figure 5:
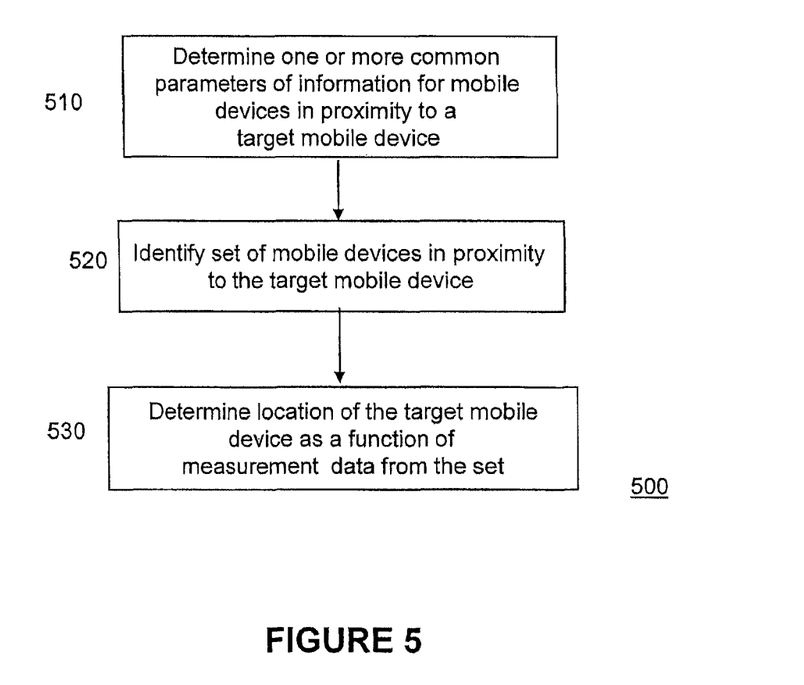
FIG. 5 is a block diagram of another embodiment of the present subject matter.

FIG. 5 is a block diagram of another embodiment of the present subject matter. With reference to FIG. 5, a method 500 is provided for determining the location of a target mobile device in a communications network. In step 510, one or more common parameters of information for mobile devices in proximity to the target mobile device may be determined, and in step 520 a set of mobile devices identified as a function of the determined one or more common parameters. In one embodiment, step 520 may include determining the set of mobile devices cooperatively by devices in the set as a function of the shared measurement data. Of course, step 520 may be alternatively performed by a communications network entity. A location of the target mobile device determined as a function of measurement data from the set of mobile devices in step 530.

In one embodiment, step 530 may include sharing measurement data from the set of mobile devices and from the target mobile device whereby the location of the target mobile device is determined as a function of the shared data. Further, this shared data may occur amongst the set of mobile devices and the target mobile device and/or may occur at a communications network entity.

The present disclosure may be implemented by a general purpose computer programmed in accordance with the principals discussed herein. It may be emphasized that the above-described embodiments, particularly any "preferred" embodiments, are merely possible examples of implementations, merely set forth for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure and the present disclosure and protected by the following claims.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a computer readable medium. The computer readable medium can be a machine-readable storage device, a machine-readable storage substrate, a memory device, or a combination of one or more of them.

The term "processor" encompasses all apparatus, devices, and machines for processing data, including by way of example a programmable processor, a computer, or multiple processors or computers. The processor can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more data memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer readable media suitable for storing computer program instructions and data include all forms data memory including non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the claimed subject matter, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As shown by the various configurations and embodiments illustrated in FIGS. 1-5, a method and system for location boosting using proximity information have been described.

While preferred embodiments of the present subject matter have been described, it is to be understood that the embodiments described are illustrative only and that the scope of the invention is to be defined solely by the appended claims when accorded a full range of equivalence, many variations and modifications naturally occurring to those of skill in the art from a perusal hereof.

What we claim is:

1. A method of determining the location of a target mobile device in a communications network comprising the steps of:
   (a) selecting a set of mobile devices to be used in locating the target mobile device, the selecting including:
   identifying mobile devices in proximity to the target mobile device according to a selected function;
   wherein the selected function is based on a common parameter of information;
   wherein the common parameter of information is observed by mobile devices in the set of mobile devices, and
   wherein each mobile device in the set of mobile devices is configured to originate and/or terminate communications with the communication network;
   (b) sharing measurement data amongst the set of mobile devices and the target mobile device; and
   (c) determining a location of the target mobile device as a function of the shared measurement data.

2. The method of claim 1 wherein the step of selecting a set of mobile devices further comprises selecting the set of mobile devices cooperatively by devices in the set as a function of the shared measurement data.

3. The method of claim 1 wherein the step of selecting a set of mobile devices is performed by a communications network entity.

4. The method of claim 1 wherein the step of selecting a set of mobile devices further comprises identifying a subset of mobile devices as a function of a second parameter.

5. The method of claim 4 wherein the second parameter is not common to each mobile device in the set of mobile devices.

6. The method of claim 1 wherein the step of determining a location of the target mobile device further comprises the step of:
   (i) determining a location for the set of mobile devices, and
   (ii) determining the location of the target mobile device as a function of the determined location for the set.

7. The method of claim 1 wherein the step of determining a location of the target mobile device further comprises the steps of:
   (i) correcting measurement data from either the target mobile device or a mobile device in the set using the shared measurement data; and
   (ii) determining the location of the target mobile device as a function of the corrected measurement data.

8. The method of claim 6 wherein the determined location for the set of mobile device is selected from the group consisting of a location of one mobile device in the set, a centroid of location of mobile devices in the set, a straight average of locations of mobile devices in the set, a weighted average of locations of mobile devices in the set, and a weighted average and a straight average of mobile devices in the set.

9. The method of claim 1 wherein the step of determining a location of the target mobile device further comprises the step of:
   (i) transmitting a location request to mobile devices in the set,
   (ii) providing measurement data from mobile devices in the set to a network entity in response to the location request, and
   (iii) determining a location of the target mobile device as a function of a set of the provided measurement data.

10. The method of claim 1 wherein the common parameter is selected from the group consisting of a Wi-Fi access point, Bluetooth radio channel information, Wi-Fi signal information, radio frequency (RF) signal parameter of signal transmissions from the mobile device, channel number information, channel frequency information, timeslot information, network timing information, range information, spreading code information, received signal strength indications, signal to noise ratios, ratios of energy per bit over power spectral density of noise and interference (Eb/Io), ratios of received pilot energy over power spectral density of noise and interference (Eb/Io), ratios of received pilot energy over power spectral density of noise and interference (Ec/Io), dialed number information, an identification of mobile device, an international mobile subscriber identity (IMSI), a temporary mobile subscriber identity (TMSI), a mobile identification number (MIN), an electronic serial number (ESN), an international mobile equipment identity (IMEI), a class mark indicator, overhead transmission indicator, media access control (MAC) address, IP address, available time assistance information, satellite-in-view information, network timing information, range measurement information to a terrestrial site, and combinations thereof.

11. The method of claim 1 wherein measurement data is selected from the group consisting of Angle-of-Arrival (AOA) data, Observed Time-Difference-of-Arrival (OT-DOA) data, Enhanced-OTD (E-OTD) data, Enhanced Cell-ID (E-CID) data, global navigation satellite system (GNSS) data, assisted global navigation satellite system (A-GNSS) data, uplink time of arrival (TOA) data, downlink TOA data, uplink TDOA (U-TDOA) data, Wi-Fi data, Multiple Range Estimation Location (MREL) data, Radio Frequency (RF) fingerprinting data, and combinations thereof.

12. A method of determining the location of a target mobile device in a communications network comprising the steps of:
   (a) selecting a set of mobile devices to be used in locating the target mobile device, the selecting including:
   identifying mobile devices in proximity to the target mobile device according to a selected function;
   wherein the selected function is based on a common parameter of information observed by mobile devices in the set of mobile devices, and
   wherein each mobile device in the set of mobile devices is configured to originate and/or terminate communications with the communication network;
   (b) transmitting measurement data from mobile devices in the set to a communications network entity;
   (c) transmitting measurement data from the target mobile device to the network entity; and
   (d) determining a location of the target mobile device as a function of both transmitted measurement data from the set of mobile devices and transmitted measurement data from the target mobile device.

13. The method of claim 12 wherein the step of selecting a set of mobile devices is performed by the communications network entity.

14. The method of claim 12 wherein the common parameter is selected from the group consisting of a Wi-Fi access point, Bluetooth radio channel information, Wi-Fi signal information, radio frequency (RF) signal parameter of signal transmissions from the mobile device, channel number information, channel frequency information, timeslot information, network timing information, range information, spreading code information, received signal strength indications, signal to noise ratios, ratios of energy per bit over power spectral density of noise and interference (Eb/Io), ratios of received pilot energy over power spectral density of noise and interference (Eb/Io), ratios of received pilot energy over power spectral density of noise and interference (Ec/Io), dialed number information, an identification of mobile device, an international mobile subscriber identity (IMSI), a temporary mobile subscriber identity (TMSI), a mobile identification number (MIN), an electronic serial number (ESN), an international mobile equipment identity (IMEI), a class mark indicator, overhead transmission indicator, media access control (MAC) address, IP address, available time assistance information, satellite-in-view information, network timing information, range measurement information to a terrestrial site, and combinations thereof.

15. The method of claim 12 wherein measurement data is selected from the group consisting of Angle-of-Arrival (AOA) data, Observed Time-Difference-of-Arrival (OT-DOA) data, Enhanced-OTD (E-OTD) data, Enhanced Cell-ID (E-CID) data, global navigation satellite system (A-GNSS) data, uplink time of arrival (TOA) data, downlink TOA data, uplink TDOA (U-TDOA) data, Wi-Fi data, Multiple Range Estimation Location (MREL) data, Radio Frequency (RF) fingerprinting data, and combinations thereof.

16. A method of determining the location of a target mobile device in a communications network comprising the steps of:
(a) selecting a set of mobile devices to be used in locating the target mobile device, the selecting including:
identifying mobile devices in proximity to the target mobile device according to a selected function;
wherein the selected function is based on a common parameter of information;
wherein the common parameter of information is observed by mobile devices in the set of mobile devices, and
wherein each mobile device in the set of mobile devices is configured to originate and/or terminate communications with the communication network;
(b) determining a location of one or more mobile devices in the set;
(c) sharing the determined location amongst mobile devices in the set and the target mobile device; and
(d) determining a location of the target mobile device as a function of the shared determined locations.

17. The method of claim 16 wherein determined location of the target mobile device is selected from the group consisting of a location of one mobile device in the set, a centroid of locations of mobile devices in the set, a straight average of locations of mobile devices in the set, a weighted average of locations of mobile devices in the set, and a weighted average and a straight average of mobile devices in the set.

18. The method of claim 16 wherein the step of determining a location of the target mobile device further comprises the step of:
(i) determining a location for the set of mobile devices, and
(ii) determining the location of the target mobile device as a function of determined location for the set.

19. The method of claim 18 wherein the determined location for the set of mobile devices is selected from the group consisting of a location of one mobile device in the set, a centroid of locations of mobile devices in the set, a straight average of ones of the locations of mobile devices in the set, a weighted average of ones of the locations of mobile devices in the set, a weighted average and a straight average of ones of the mobile devices in the set, and combinations thereof.

20. A method of determining the location of a target mobile device in a communications network comprising the steps of:
(a) determining one or more common parameters of information for a set of mobile devices in proximity to the target mobile device, wherein each mobile device in the set of mobile devices is configured to originate and/or terminate communications with the communication network;
(b) identifying a set of mobile devices as a function of the determined one or more common parameters;
(c) determining a location of the target mobile device as a function of measurement data from the set of mobile devices; and wherein the step of determining a location of the target mobile device further comprises sharing measurement data from the set of mobile devices and from the target mobile device and determining the location using the shared data.

21. The method of claim 20 wherein the step of sharing measurement data occurs amongst the set of mobile devices and the target mobile device.

22. The method of claim 20 where in the step of sharing measurement data occurs at a communications network entity.

23. The method of claim 20 wherein the step of identifying a set of mobile devices further comprises determining the set of mobile devices cooperatively by devices in the set as a function of the shared measurement data.

24. The method of claim 20 wherein the step of identifying a set of mobile devices is performed by a communications network entity.

25. A method of determining the location of a target mobile device in a communications network comprising the steps of:
(a) selecting a set of mobile devices to be used in locating the target mobile device, the selecting including:
identifying mobile devices in proximity to the target mobile device according to a selected function;
wherein the selected function is based on a common parameter of information;
wherein the common parameter of information is observed by mobile devices in the set of mobile devices, and
wherein each mobile device in the set of mobile devices is configured to originate and/or terminate communications with the communication network; and (b) determining a location of the target mobile device as a function of measurement data from the determined set of mobile devices.

26. The method of claim 25 wherein the step of determining a location of the target mobile device further comprises sharing measurement data amongst the set of mobile devices and the target mobile device and determining the location using the shared data.

* * * * *